(12) United States Patent
Shimazaki et al.

(10) Patent No.: US 12,176,152 B2
(45) Date of Patent: Dec. 24, 2024

(54) CERAMIC ELECTRONIC DEVICE AND MANUFACTURING METHOD OF THE SAME

(71) Applicant: TAIYO YUDEN CO., LTD., Tokyo (JP)

(72) Inventors: Kyosuke Shimazaki, Tokyo (JP); Takashi Asai, Tokyo (JP); Takayuki Hattori, Tokyo (JP); Keisuke Ishii, Tokyo (JP); Shin Nishiura, Tokyo (JP); Yoshimasa Kitamura, Tokyo (JP); Hirotaka Ohno, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 57 days.

(21) Appl. No.: 17/835,424

(22) Filed: Jun. 8, 2022

(65) Prior Publication Data

US 2023/0005669 A1  Jan. 5, 2023

(30) Foreign Application Priority Data

Jun. 30, 2021 (JP) .............................. JP2021-109227

(51) Int. Cl.
*H01G 4/30* (2006.01)
*H01G 4/012* (2006.01)
*H01G 4/12* (2006.01)

(52) U.S. Cl.
CPC ............... *H01G 4/30* (2013.01); *H01G 4/012* (2013.01); *H01G 4/12* (2013.01)

(58) Field of Classification Search
CPC ............ H01G 4/30; H01G 4/12; H01G 4/012; H01G 4/005; H01G 4/008; H01G 4/1227
USPC ..... 361/301.4, 321.1, 321.3, 306.3, 303, 311
See application file for complete search history.

(56) References Cited

U.S. PATENT DOCUMENTS

| | | | | |
|---|---|---|---|---|
| 7,298,603 B2* | 11/2007 | Mizuno | ................... | H01G 4/015 29/25.42 |
| 2012/0307417 A1* | 12/2012 | Kim | ......................... | H01G 4/012 361/321.2 |
| 2015/0027764 A1* | 1/2015 | Lee | ........................... | H01G 4/30 29/25.42 |
| 2016/0163458 A1* | 6/2016 | Park | ........................ | B32B 18/00 361/301.4 |
| 2017/0162327 A1* | 6/2017 | Mizuno | ................... | H01G 4/232 |
| 2017/0243695 A1* | 8/2017 | Kim | ......................... | H01G 4/012 |
| 2018/0012702 A1* | 1/2018 | Azuma | .................... | H01G 4/248 |
| 2018/0166217 A1* | 6/2018 | Kato | ....................... | H01G 4/012 |

FOREIGN PATENT DOCUMENTS

JP          2006-335045 A       12/2006

* cited by examiner

*Primary Examiner* — Arun Ramaswamy
(74) *Attorney, Agent, or Firm* — Stein IP, LLC

(57) ABSTRACT

A ceramic electronic device includes a multilayer structure having a substantially rectangular parallelepiped shape, a first cover layer, and a second cover layer that is provided on a second end of the multilayer structure in the stacking direction, a main component of the second cover layer being ceramic, a porosity of the second cover layer being higher than that of the first cover layer. $Q=(A+B)/2C\times100(\%)$ is 0.5% or more and 1.6% or less, when, at an interface of the second cover layer on a side of the first cover layer, two heights of curvature portions of both ends of the interface are respectively a height A and a height B, and a shortest height from the first cover layer to the second cover layer is a height C.

7 Claims, 9 Drawing Sheets

CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2021-109227, filed on Jun. 30, 2021, the entire contents of which are incorporated herein by reference.

FIELD

A certain aspect of the present invention relates to a ceramic electronic device and a manufacturing method of the ceramic electronic device.

BACKGROUND

Multilayer ceramic capacitors are used to suppress voltage fluctuations in circuits of electronic devices. The mounting density has continued to increase in recent years, and the capacity density has continued to increase as the size and capacity of the multilayer ceramic capacitors have increased. In addition, the market has expanded to various fields such as automobiles and medical devices due to the digitization of IoT and automobiles, and the demand for long product life is extremely increasing even for thin-layer and high-capacity multilayer ceramic capacitors.

SUMMARY OF THE INVENTION

According to an aspect of the present invention, there is provided a ceramic electronic device including: a multilayer structure having a structure in which each of a plurality of dielectric layers of which a main component is ceramic and each of a plurality of internal electrode layers are alternately stacked and having a substantially rectangular parallelepiped shape, the plurality of internal electrode layers being alternately exposed to each of two end faces opposite to each other of the rectangular parallelepiped shape; a first cover layer that is provided on a first end of the multilayer structure in a stacking direction, a main component of the first cover layer being ceramic; and a second cover layer that is provided on a second end of the multilayer structure in the stacking direction, a main component of the second cover layer being ceramic, a porosity of the second cover layer being higher than that of the first cover layer, wherein $Q=(A+B)/2C \times 100(\%)$ is 0.5% or more and 1.6% or less, when, at an interface of the second cover layer on a side of the first cover layer in a cross section vertical to a direction in which the two end faces are opposite to each other, two heights of curvature portions of both ends of the interface in the stacking direction are respectively a height A and a height B, and a shortest height in the stacking direction from the first cover layer to the second cover layer is a height C.

According to another aspect of the present invention, there is provided a manufacturing method of a ceramic electronic device including: forming a plurality of stack units by screen-printing each of internal electrode patterns including metal powder on each of dielectric green sheets including ceramic powder; forming a ceramic multilayer structure having a substantially rectangular parallelepiped shape by stacking the plurality of stack units on a first cover sheet including ceramic powder and stacking a second cover sheet including ceramic powder on the plurality of stack units so that the plurality of internal electrode layers are alternately exposed to each of two end faces opposite to each other of the rectangular parallelepiped shape; and forming a first cover layer from the first cover sheet and a second cover layer from the second cover sheet by firing the ceramic multilayer structure, wherein a screen used in the screen-printing has a non-permeable volume portion or a dilution rate of the internal electrode pattern is adjusted so that $Q=(A+B)/2C \times 100(\%)$ is 0.5% or more and 1.6% or less, when, at an interface of the second cover layer on a side of the first cover layer in a cross section vertical to a direction in which the two end faces are opposite to each other, two heights of curvature portions of both ends of the interface in the stacking direction are respectively a height A and a height B, and a shortest height in the stacking direction from the first cover layer to the second cover layer is a height C.

DETAILED DESCRIPTION

In the process of manufacturing ceramic electronic devices such as the multilayer ceramic capacitors, when an internal electrode pattern of metal conductive paste is screen-printed on a dielectric green sheet, an edge portion of the internal electrode pattern is raised higher by the generated printing saddle (for example, see Japanese Patent Application Publication No. 2006-335045). This printing saddle is generated with symmetry at the edges of the internal electrode pattern for each layer. Therefore, in a ceramic electronic device having a high stacking density, the sheet tends to be greatly curved at the edge portion of the internal electrode pattern adjacent to an upper cover sheet due to accumulation of the printing saddles due to the stacking.

Further, when electric field intensity at the chip end is locally increased due to the influence of the printing saddle, it is considered that the insulating property is degraded. When the failure analysis of short-life chips is actually performed, failure points tended to be concentrated on the left and right edges of the internal electrode layer. In order to increase the capacity density of ceramic electronic devices, it is desirable to make the dielectric green sheet thinner to increase the stacking density. Therefore, the effect of these printing saddles becomes more remarkable as the capacity density increases.

On the other hand, the curvature of the stacked internal electrode patterns also has an effect of improving adhesion between the upper cover sheet and the internal electrode pattern due to anchor effect. As the number of the stacked layers of the ceramic electronic devices is increased, there is a risk that the internal electrode patterns will be misaligned when pressed with a strong force when the upper cover sheet is stacked after the internal electrode patterns are stacked. Therefore, it is desired to reduce the pressing pressure. As a result, the adhesion between the internal electrode pattern and the upper cover sheet is reduced, and the risk of delamination increases. This delamination causes poor moisture resistance and the like. In a multi-layered product, when the curvature of the internal electrode pattern is too small, the risk of delamination at the interface between the internal electrode pattern and the upper cover sheet tends to increase due to the decrease in the anchor effect.

A description will be given of an embodiment with reference to the accompanying drawings.

Figure 1:
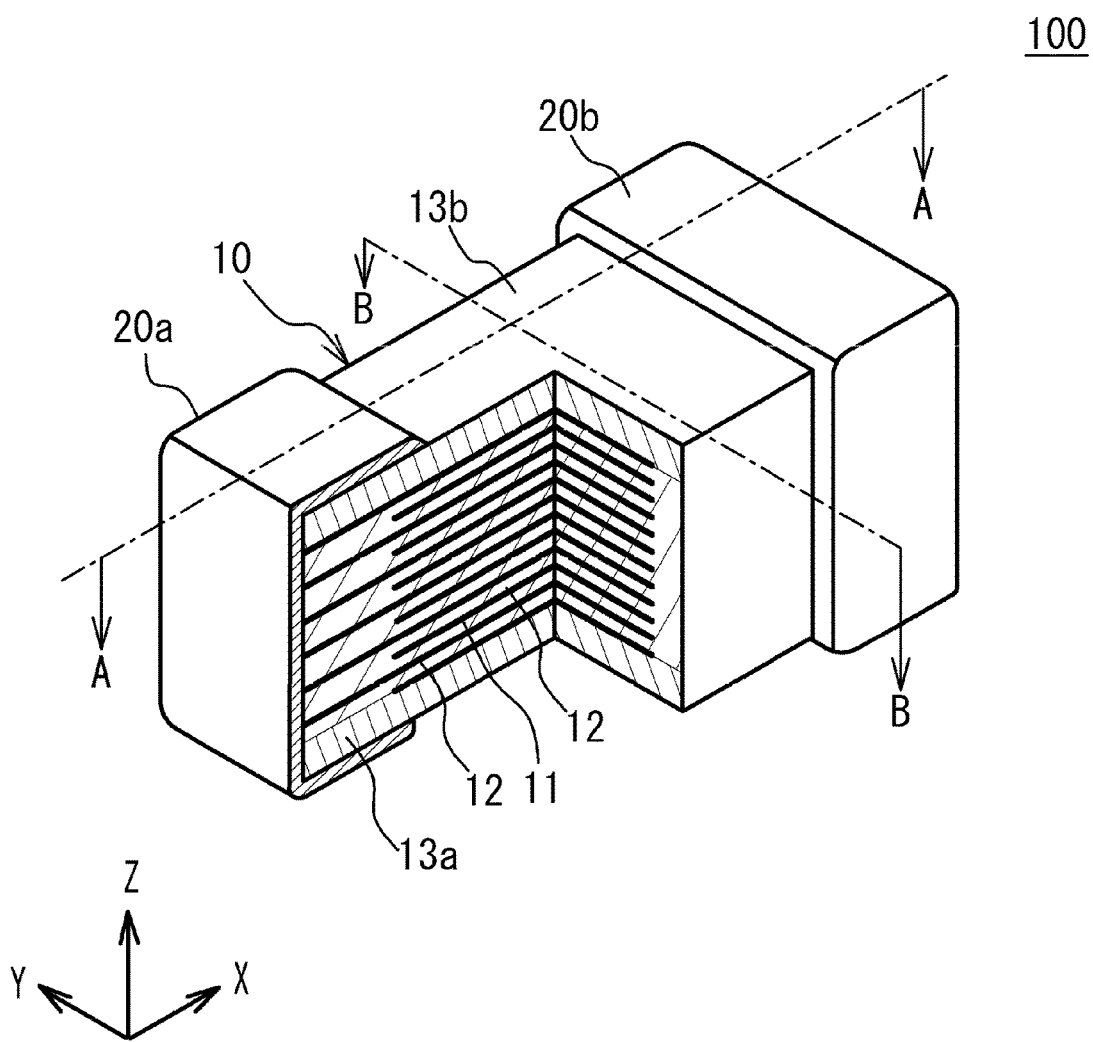
FIG. 1 illustrates a perspective view of a multilayer ceramic capacitor in which a cross section of a part of the multilayer ceramic capacitor is illustrated.
Figure 2:
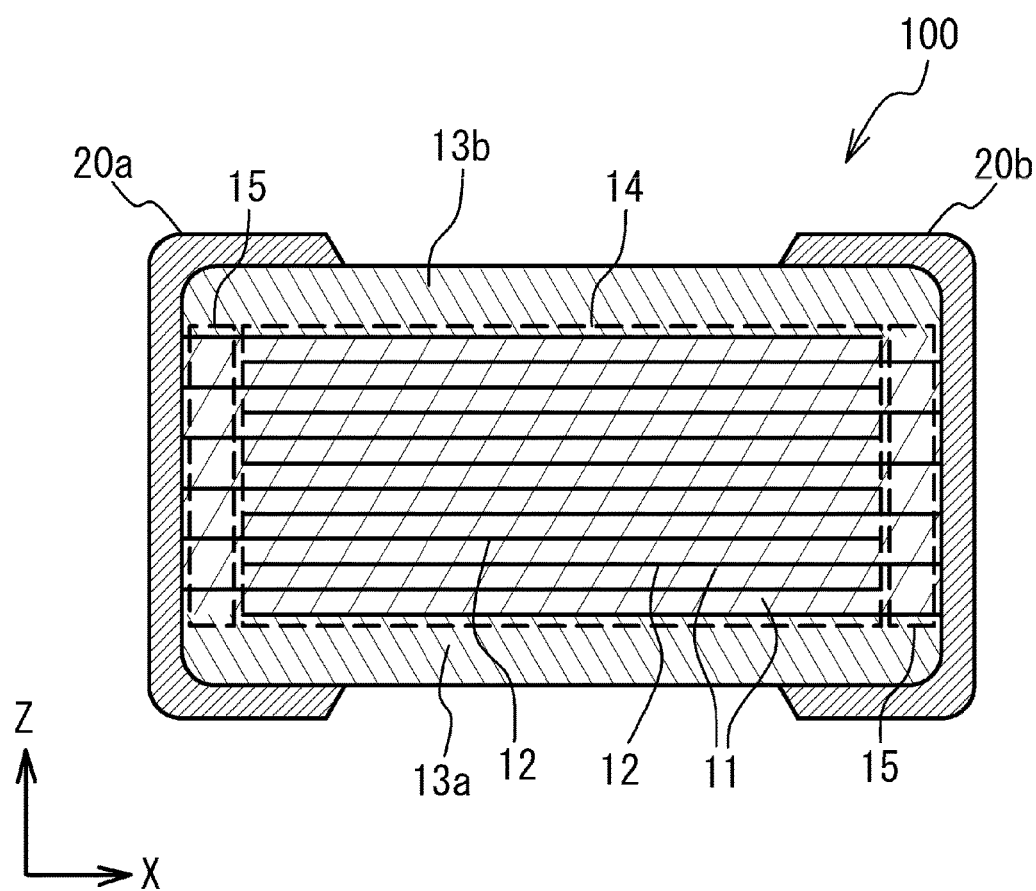
FIG. 2 illustrates a cross sectional view taken along a line A-A of FIG. 1.
Figure 3:
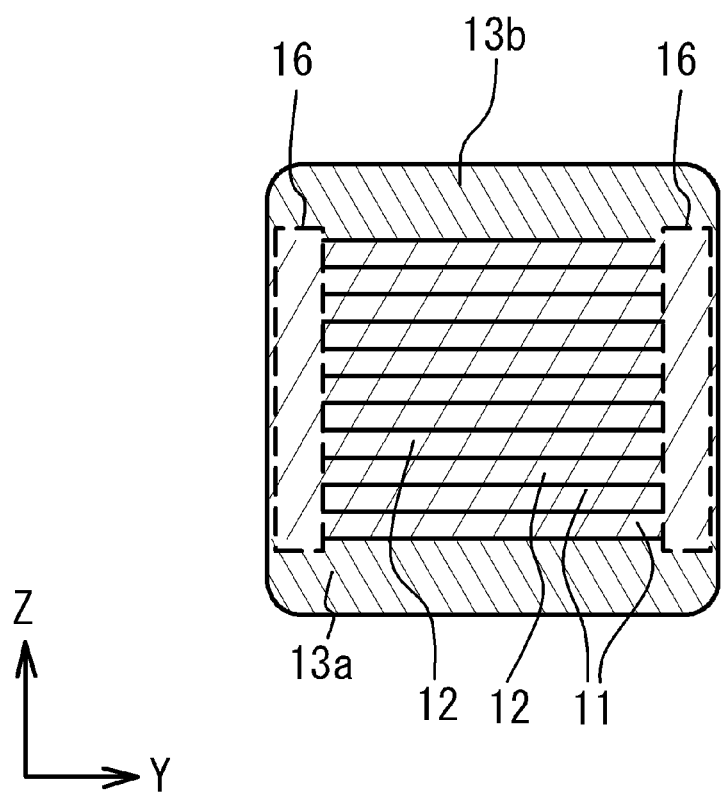
FIG. 3 illustrates a cross sectional view taken along a line B-B of FIG. 1.

(Embodiment) FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

In FIG. 1 to FIG. 3, an X-axis direction is a longitudinal direction of the multilayer chip 10. The X-axis direction is a direction in which the external electrode 20a is opposite to the external electrode 20b. A Y-axis direction is a width direction of the internal electrode layers. The Y-axis direction is a direction in which the two side faces of the multilayer chip 10 are opposite to each other. A Z-axis direction is a stacking direction. The Z-axis direction is a direction in which the upper face of the multilayer chip 10 is opposite to the lower face of the multilayer chip 10. The X-axis direction, the Y-axis direction and the Z-axis direction are vertical to each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The lower face and the upper face of the multilayer structure that are the internal electrode layers 12 are respectively covered by a first cover layer 13a and a second cover layer 13b. A main component of the first cover layer 13a and the second cover layer 13b is a ceramic material. For example, a main component of the first cover layer 13a and the second cover layer 13b is the same as that of the dielectric layer 11.

For example, the multilayer ceramic capacitor 100 may have a length of 1.6 mm, a width of 0.8 mm and a height of 0.8 mm. The multilayer ceramic capacitor 100 may have a length of 2.0 mm, a width of 1.25 mm and a height of 1.25 mm. The multilayer ceramic capacitor 100 may have a length of 3.2 mm, a width of 1.6 mm and a height of 1.6 mm. The multilayer ceramic capacitor 100 may have a length of 3.2 mm, a width of 2.5 mm and a height of 2.5 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as Ni (nickel), Cu (copper), or Sn (tin). The main component of the internal electrode layers 12 may be a noble metal such as Pt (platinum), Pd (palladium), Ag (silver), or Au (gold), or an alloy thereof.

The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

Figure 4:
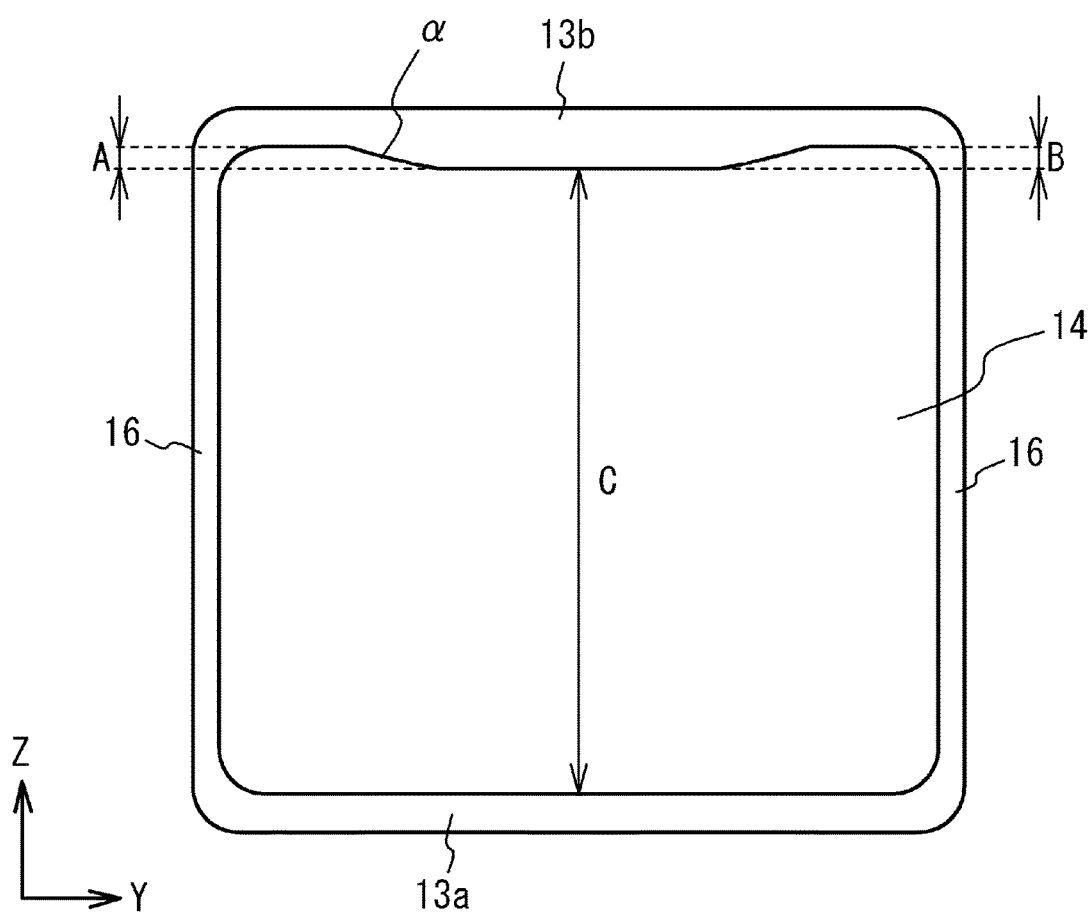
FIG. 4 illustrates details of each shape of each portion of a cross section of FIG. 3.

Next, details of the shape of each part in the cross section of FIG. 3 will be described. FIG. 4 is a diagram illustrating the details of the shape of each part in the cross section of FIG. 3. When the multilayer chip 10 is manufactured, a lower cover sheet that becomes the first cover layer 13a after firing is arranged on a minus side in the Z-axis direction. On this lower cover sheet, the stack units to be the dielectric layer 11 and the internal electrode layer 12 after the firing are sequentially stacked toward the plus side in the Z-axis direction. An upper cover sheet to be the second cover layer 13b after the firing is stacked on the stacked structure. Pressing is performed each time each stack unit is stacked. After the stacking, the firing is performed. Since the number of pressing against the lower cover sheet to be the first cover layer 13a is large, the adhesion of the first cover layer 13a is higher than that of the second cover layer 13b. As the number of pressing increases, the number of pores and the like decreases, so that the pore ratio (porosity) of the first cover layer 13a is lower than that of the second cover layer 13b after the firing.

Since the internal electrode pattern to be the internal electrode layer 12 after the firing is printed by screen printing, a printing saddle is generated at the edge portion. Therefore, by going through the stacking process, the interface a between the second cover layer 13b and the uppermost internal electrode layer 12 is curved after the firing. At this interface a, both ends in the Y-axis direction are curved so as to project to the plus side in the Z-axis direction more than the vicinity of the center. The height of the curved portion on the minus side in the Y-axis direction is referred to as a height A. The height of the curved portion on the plus side in the Y-axis direction is referred to as a height B. The height A is the height from the lower end on the minus side in the Z-axis direction to the upper end on the plus side in the Z-axis direction at the interface between the second cover layer 13b and the uppermost internal electrode layer 12. The height B is the height from the lower end on the minus side in the Z-axis direction to the upper end on the plus side in the Z-axis direction at the interface. The lower end on the minus side in the Z-axis direction at the interface tends to be located near the center in the Y-axis direction. The height of the capacity section 14 in the Z-axis direction (the shortest height from the first cover layer 13a to the second cover layer 13b) is referred to as a height C. The height C tends to be a height near the center of the capacity section 14 in the Y-axis direction.

The embodiment focuses on the ratio of the heights A and B of the curved portion with respect to the height C (curved amount ratio). In concrete, the curved amount ratio Q (%) is defined as $(A+B)/2C \times 100(\%)$. When the curved amount ratio Q is large, the curved amount of the curved portion is large with respect to the height C of the capacity section 14. When the curved amount ratio Q is too large, the electric field strength in the curved portion may be locally increased and the insulating property may be degraded. Therefore, an upper limit is set for the curved amount ratio Q. On the other hand, when the curved amount ratio Q is small, the curved amount of the curved portion is small with respect to the height C of the capacity section 14. When the curved amount ratio Q is too small, the anchor effect between the second cover layer 13b and the uppermost internal electrode layer 12 is reduced, and delamination may occur. Therefore, a lower limit is set for the curved amount ratio Q. By setting the upper limit and the lower limit of the curved amount ratio Q, it is possible to realize the multilayer ceramic capacitor 100 having excellent insulating property and less delamination. In the embodiment, the curved amount ratio Q is 0.5% or more and 1.6% or less.

The curved amount ratio Q is preferably 1.3% or less from the viewpoint of suppressing the local increase in the electric field strength in the curved portion. From the viewpoint of suppressing the decrease in the anchor effect, the curved amount ratio Q is preferably 0.7% or more.

The larger the number of layers L of the internal electrode layer 12 is, the greater the influence of the printing saddle is. For example, when the number of layers L is 600 or more, the influence of the printing saddle becomes particularly remarkable. Therefore, when the number of layers L is 600 or more, the effect of adjusting the curved amount ratio Q becomes remarkable. The number of layers L is, for example, 800 or more, or 920 or more.

The amount of metal conductive paste printed on a large-sized multilayer ceramic capacitor is larger than that of a small-sized multilayer ceramic capacitor. For example, in a multilayer ceramic capacitor having a shape of 1608 shape (length 1.6 mm, width 0.8 mm, height 0.8 mm) or more, the influence of the printing saddle becomes particularly remarkable. Therefore, in a multilayer ceramic capacitor having a size of 1608 or more, the effect of adjusting the curved amount ratio Q becomes remarkable. The multilayer ceramic capacitor 100 has, for example, a size of 2012 shape (length 2.0 mm, width 1.25 mm, height 1.25 mm) or more, or a 3216 shape (length 3.2 mm, width 1.6 mm, height 1.6 mm) or more.

The higher the stacking density is, the greater the effect of the printing saddle is. For example, when the stacking density P is defined as P=L/C, the influence of the printing saddle becomes particularly remarkable when P=0.58 or more. Therefore, in a multilayer ceramic capacitor having P=0.58 or more, the effect of adjusting the curved amount ratio Q becomes remarkable. For example, the stacking density P is 0.73 or more, or 0.76 or more.

The larger the height C is, the larger the size of the multilayer ceramic capacitor is. Therefore, the influence of the printing saddle becomes larger. For example, when the height C is 800 μm or more, the influence of the printing saddle becomes particularly remarkable. Therefore, in a multilayer ceramic capacitor having the height C=800 μm or more, the effect of adjusting the curved amount ratio Q becomes remarkable. For example, the height C is 1100 μm or more, or 1600 μm or more.

Figure 5:
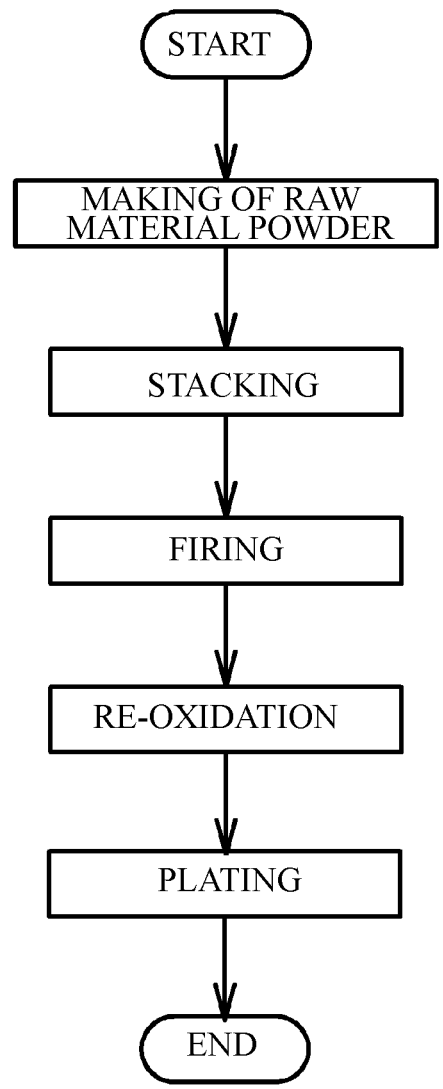
FIG. 5 illustrates a manufacturing method of a multilayer ceramic capacitor.

Next, a description will be given of a manufacturing method of the multilayer ceramic capacitor 100. FIG. 5 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to the resulting ceramic powder, in accordance with purposes. The additive compound may be an oxide of magnesium (Mg), manganese (Mn), vanadium (V), chromium (Cr) or a rare earth element (yttrium (Y), samarium (Sm), europium (Eu), gadolinium (Gd), terbium (Tb), dysprosium Dy), holmium (Ho), erbium (Er), thulium (Tm) and ytterbium (Yb)), or an oxide of cobalt (Co), nickel (Ni), lithium (Li), boron (B), sodium (Na), potassium (K) and silicon (Si). The additive compound may be a glass including cobalt, nickel, lithium, boron, sodium, potassium or silicon.

(Stacking process) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 51 is painted on a base material by, for example, a die coater method or a doctor blade method, and then dried.

Figure 6A:
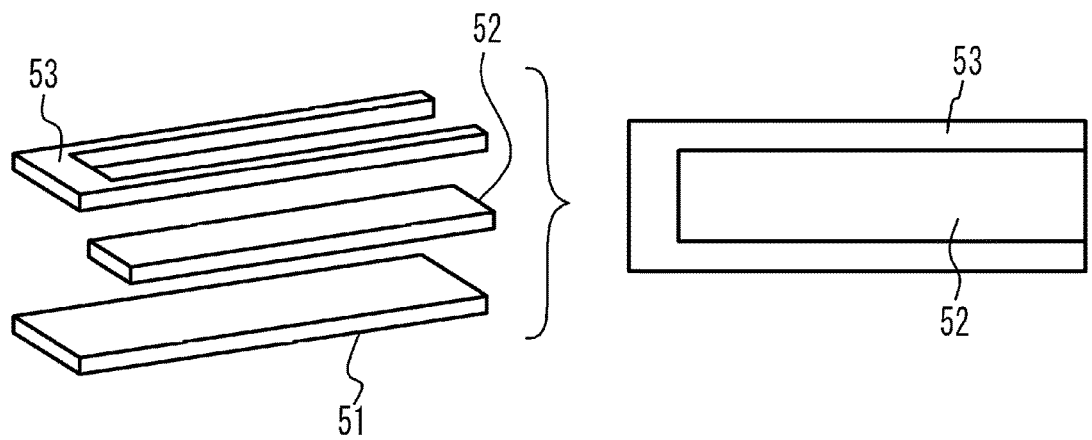
FIG. 6A and FIG. 6B illustrate a stacking process.

Next, as illustrated in FIG. 6A, an internal electrode pattern 52 is printed on the dielectric green sheet 51 by a screen-printing metal conductive paste which includes an organic binder and is used for forming the internal electrode layer. As a co-material, ceramic particles are added to the metal conductive paste. The components of the ceramic particles are not limited. It is preferable that the components of the ceramic particles are the same as the main component ceramic of the dielectric layer 11.

Next, as illustrated in FIG. 6A, a reverse patter 53 is provided on a part of the dielectric green sheet 51, where the internal electrode pattern 52 is not printed, by printing the reverse pattern paste. Thereby, a level difference caused by the internal electrode pattern 52 is canceled. The component of the reverse pattern may be the same as that of the dielectric green sheet 51. An additive compound of the reverse pattern paste may be different from that of the dielectric green sheet 51. The dielectric green sheet 51 on which the internal electrode pattern 52 and the reverse pattern 53 are printed is referred to as a stack unit.

Figure 6B:
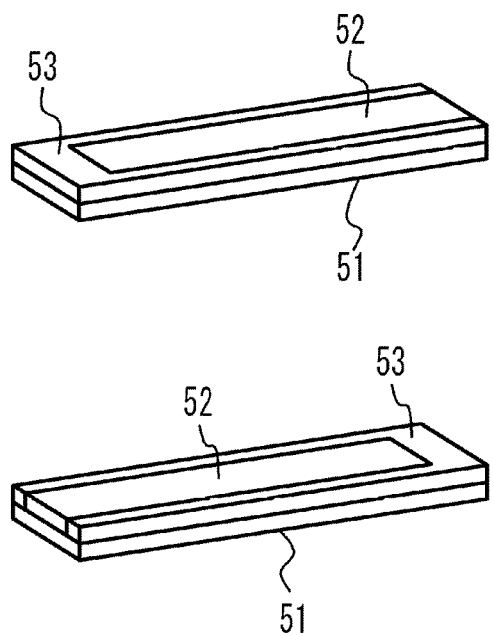

A predetermined number of the lower cover sheets (for example, 2 to 10) are stacked. As illustrated in FIG. 6B, the stack units are stacked so that the internal electrode layers 12 are alternately shifted, and the edges of the internal electrode layers 12 are alternately exposed to the both end faces where the external electrodes 20a and 20b are to be formed. The multilayer structure by stacking the stack units is pressed every time each stack unit is stacked.

Figure 7:
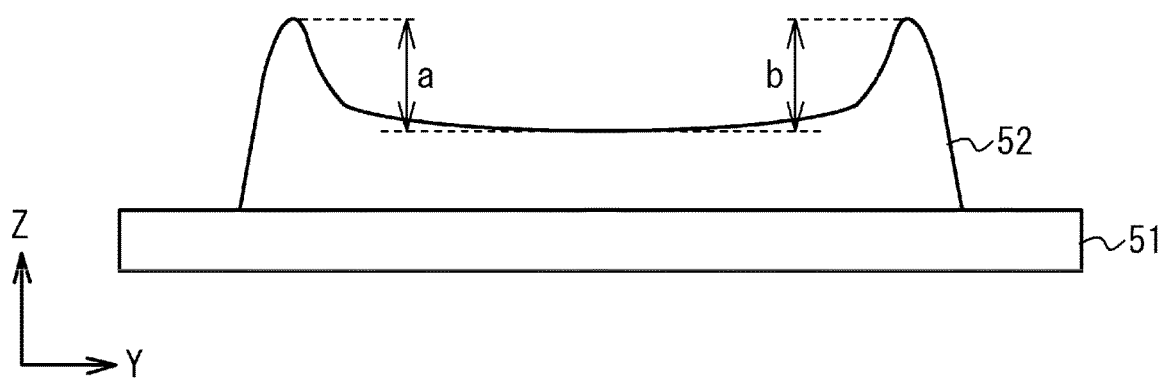
FIG. 7 illustrates an internal electrode pattern printed on a dielectric green sheet.

In this stacking process, there is a risk that the curvature will increase due to the accumulation of printing saddles. Therefore, in the present embodiment, the cumulative amount of the printing saddle is reduced. First, FIG. 7 is a diagram illustrating a state in which the internal electrode pattern 52 is printed on the dielectric green sheet 51. As illustrated in FIG. 7, a printing saddle is generated at the edge portions on both sides of the printed internal electrode pattern 52. The height of the printing saddle on the minus side in the Y-axis direction is referred to as a height "a". The height of the printing saddle on the plus side in the Y-axis direction is referred to as a height "b". The height "a" and the height "b" are the heights in the Z-axis direction from the upper surface of the thinnest portion near the center in the Y-axis direction.

Figure 8:
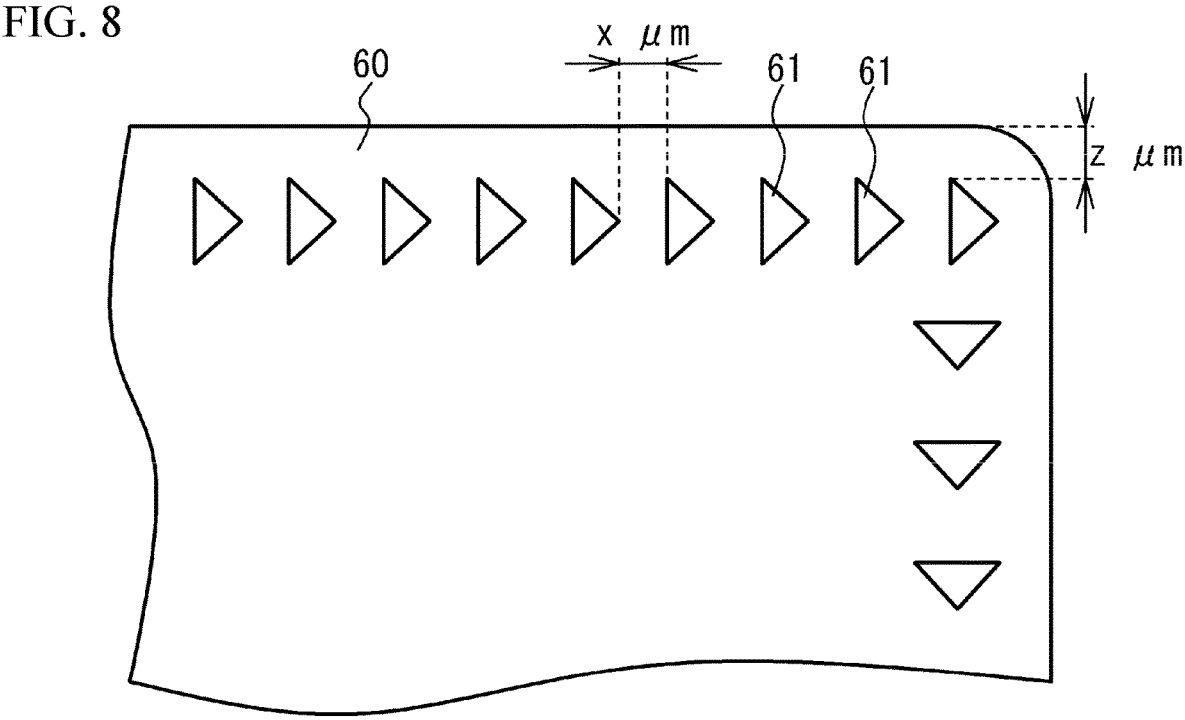
FIG. 8 illustrates a non-permeable volume portion of a screen.

The printing saddle tends to be formed on the peripheral portion of the internal electrode pattern 52 in a planar view. Therefore, in the embodiment, as illustrated in FIG. 8, in a print screen 60, dot-shaped non-permeable volume portions 61 are formed at predetermined intervals in the region corresponding to the peripheral edge portion of the internal electrode pattern 52 in the planar view. In the non-permeable volume portion 61, the permeation amount of the metal conductive paste can be suppressed. By filling the voids in the non-permeable volume portion 61 by leveling the peripheral paste of the non-permeable volume portion 61, it is possible to reduce the amount of the printing saddle in the peripheral portion in the planar view of the internal electrode pattern 52. For example, the non-permeable volume portion 61 of 0.01% of the volume of the internal electrode pattern 52 can be arranged at a distance of "z" µm from the peripheral edge of the internal electrode pattern 52 at an interval of "x" µm. The distance "z" is a value of 1% to 5% with respect to the width of the internal electrode pattern 52 (the short side of the rectangular pattern). "x" is, for example, 40 µm or more and 200 µm or less.

Figure 9:
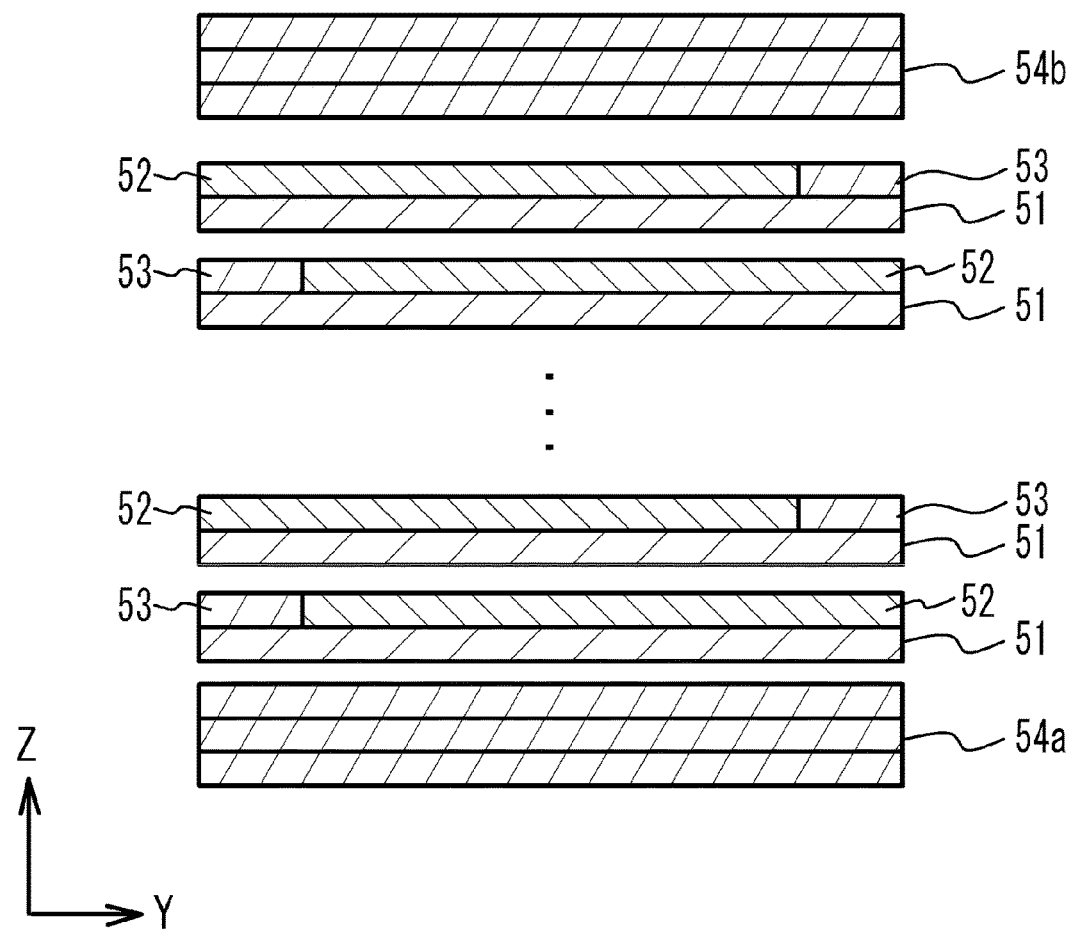
FIG. 9 illustrates a cross section in a stacking direction.

Next, a predetermined number (for example, 2 to 10) of upper cover sheets are stacked on an upper face of the multilayer structure of the stacked stack units and is thermally crimped. The resulting multilayer structure is cut into a chip having a predetermined size (for example, 1.6 mm×0.8 mm). FIG. 9 illustrates a cross section of the multilayer structure. As illustrated in FIG. 9, on a lower cover sheet 54a to be the first cover layer 13a after the firing, a plurality of the dielectric green sheets 51, on which the internal electrode pattern 52 and the reverse pattern 53 are printed, are stacked. A plurality of upper cover sheets 54b to be the second cover layer 13b after the firing are stacked on the stacked stack units. The components of the lower cover sheet 54a and the upper cover sheet 54b may be the same as those of the dielectric green sheet 51. Additives of the lower cover sheet 54a and the upper cover sheet 54b may be different from those of the dielectric green sheet 51.

(Firing process) The binder is removed from the ceramic multilayer structure in $N_2$ atmosphere. Metal paste to be the base layers of the external electrodes 20a and 20b is applied to the ceramic multilayer structure by a dipping method. The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C. In this manner, it is possible to manufacture the multilayer ceramic capacitor 100.

(Re-oxidizing process) After that, a re-oxidizing process may be performed in $N_2$ gas atmosphere in a temperature range of 600 degrees C. to 1000 degrees C.

(Plating process) After that, by a plating method, metal layers such as Cu, Ni, Sn or the like may be plated on the external electrodes 20a and 20b.

According to the manufacturing method in accordance with the embodiment, in the screen when the internal electrode pattern 52 is screen-printed, the dot-shaped non-permeable volume portions are formed at predetermined intervals. It is therefore possible to adjust the ratio of the heights A and B of the curved portion (curved amount ratio Q) to 0.5% or more and 1.6% or less. As a result, it is possible to realize the multilayer ceramic capacitor 100 having excellent insulating properties and less delamination. For example, in the screen in the screen printing, a non-permeation ratio R can be adjusted. The non-permeation ratio R is a ratio of the non-permeable volume with respect to the volume of the internal electrode printed on the dielectric green sheet. For example, the non-permeation ratio may be adjusted to 1% or more and 4.5% or less.

Alternatively, the curved amount ratio Q can be adjusted to 0.5% or more and 1.6% or less by adjusting a dilution rate "d" in the metal electrode pattern. As a result, it is possible to realize the multilayer ceramic capacitor 100 having excellent insulating properties and less delamination. The dilution ratio "d" is a solvent ratio of the metal conductive paste.

In the embodiments, the multilayer ceramic capacitor is described as an example of ceramic electronic devices.

However, the embodiments are not limited to the multilayer ceramic capacitor. For example, the embodiments may be applied to another electronic device such as varistor or thermistor.

EXAMPLES (Comparative Example 1) Ceramic powder containing barium titanate as a main component was kneaded with an organic binder to form slurry, which was formed into a sheet shape with a doctor blade or the like to prepare the dielectric green sheet 51. The internal electrode pattern 52 was formed by applying metal conductive paste containing Ni as a main component metal in a predetermined pattern to the dielectric green sheet 51 by screen printing. The screen in the screen printing was not provided with the non-permeable volume portion as described in FIG. 8. The reverse pattern 53 was printed on the portion of the dielectric green sheet 51 where the internal electrode pattern 52 was not printed. A predetermined number of the lower cover sheets 54a were stacked. And, the stack units were stacked so that the internal electrode layers 12 were alternately shifted, and the edges of the internal electrode layers 12 were alternately exposed to the both end faces where the external electrodes 20a and 20b were to be formed. The multilayer structure by stacking the stack units was pressed. After that, a predetermined number of the upper cover sheets 54b were stacked on the multilayer structure. The resulting multilayer structure was crimped. The resulting multilayer structure was cut into a predetermined chip size. After the binder removal treatment, conductive paste containing a co-material was applied to the exposed surface of the internal electrode so as to have a predetermined size. Then, firing was performed in a reducing atmosphere at 1250 degrees C. In this manner, a thermal process was performed. Then, the plating treatment was performed using the external electrode as a base layer.

A multilayer ceramic capacitor with a 2012 shape (length 2.0 mm, width 1.25 mm, height 1.25 mm) was manufactured. The number of layers L of the internal electrode layers was set to 890. The height A was 18.9 μm. The height B was 20.3 μm. The height C was 1177.4 μm. The stacking density P=L/C was 0.76. The curved amount ratio Q was 1.66%.

TABLE 1

| | SHAPE | L | P | A (μm) | B (μm) | C (μm) | Q |
|---|---|---|---|---|---|---|---|
| COMPARATIVE EXAMPLE 1 | 2012 | 890 | 0.76 | 18.9 | 20.3 | 1177.4 | 1.66% |

(Examples 1 to 5 and Comparative Examples 1 to 3) Next, regarding the structure of the comparative example 1, the non-permeable volume portion of the metal conductive paste was arranged according to the screen design used for screen printing, and the curved amount ratio Q was made different.

In an example 1, the interval "x" described in FIG. 8 was set to 200 μm. The non-permeation ratio R was set to 0.68%. The distance "z" described in FIG. 8 was set to 2% of the width of the internal electrode. As a result, the height "a" was 70 nm and the height "b" was 69 nm. After firing, the height A was 17.6 μm, the height B was 18.0 μm, and the height C was 1168.4 μm. The stacking density P was 0.76, and the curved amount ratio Q was 1.52%. It was confirmed that the pore ratio of the second cover layer 13b was higher than that of the first cover layer 13a.

In an example 2, the interval "x" described in FIG. 8 was set to 150 μm. The non-permeation ratio R was set to 0.91%. The distance "z" described in FIG. 8 was set to 2% of the width of the internal electrode. As a result, the height "a" was 59 nm and the height "b" was 60 nm. After firing, the height A was 16.3 μm, the height B was 13.7 μm, and the height C was 1180.3 μm. The stacking density P was 0.75, and the curved amount ratio Q was 1.38%. It was confirmed that the pore ratio of the second cover layer 13b was higher than that of the first cover layer 13a.

In an example 3, the interval "x" described in FIG. 8 was set to 100 μm. The non-permeation ratio R was 1.37%. The distance "z" described in FIG. 8 was set to 2% of the width of the internal electrode. As a result, the height "a" was 45 nm and the height "b" was 47 nm. After firing, the height A was 13.9 μm, the height B was 12.4 μm, and the height C was 1158.3 μm. The stacking density P was 0.77, and the curved amount ratio Q was 1.14%. It was confirmed that the pore ratio of the second cover layer 13b was higher than that of the first cover layer 13a.

In an example 4, the interval "x" described in FIG. 8 was set to 50 μm. The non-permeation ratio R was set to 2.73%. The distance "z" described in FIG. 8 was set to 2% of the width of the internal electrode. As a result, the height "a" was 38 nm and the height "b" was 29 nm. After firing, the height A was 8.7 μm, the height B was 7.9 μm, and the height C was 1160.0 μm. The stacking density P was 0.77, and the curved amount ratio Q was 0.72%. It was confirmed that the pore ratio of the second cover layer 13b was higher than that of the first cover layer 13a.

In an example 5, the interval "x" described in FIG. 8 was set to 40 μm. The non-permeation ratio R was set to 3.41%. The distance "z" described in FIG. 8 was set to 2% of the width of the internal electrode. As a result, the height "a" was 23 nm and the height "b" was 19 nm. After firing, the height A was 6.3 μm, the height B was 7.1 μm, and the height C was 1157.0 μm. The stacking density P was 0.77, and the curved amount ratio Q was 0.58%. It was confirmed that the pore ratio of the second cover layer 13b was higher than that of the first cover layer 13a.

In the comparative example 1, since the screen was not provided with the non-permeable volume portion, the height "a" was 87 nm and the height "b" was 82 nm. It was confirmed that the pore ratio of the second cover layer 13b was higher than that of the first cover layer 13a.

In a comparative example 2, the interval "x" described in FIG. 8 was set to 30 μm. The non-permeation ratio R was set to 4.55%. The distance "z" described in FIG. 8 was set to 2% of the width of the internal electrode. As a result, the height "a" was 11 nm and the height "b" was 15 nm. After firing, the height A was 5.5 μm, the height B was 5.2 μm, and the height C was 1179.1 μm. The stacking density P was 0.75, and the curved amount ratio Q was 0.45%. It was confirmed that the pore ratio of the second cover layer 13b was higher than that of the first cover layer 13a.

In a comparative example 3, the interval "x" described in FIG. 8 was set to 20 μm. The non-permeation ratio R was set to 6.83%. The distance "z" described in FIG. 8 was set to 2% of the width of the internal electrode. As a result, the height "a" was 4 nm and the height "b" was 8 nm. After firing, the height A was 3.0 μm, the height B was 4.1 μm, and the height C was 1170.0 μm. The stacking density P was 0.76, and the curved amount ratio Q was 0.30%. It was confirmed that the pore ratio of the second cover layer 13b was higher than that of the first cover layer 13a.

Table 2 shows the results of the examples 1 to 5 and the comparative examples 1 to 3.

TABLE 2

| | x (μm) | R | a (nm) | b (nm) | A (μm) | B (μm) | C (μm) | P | Q | DELAMI-NATION | LONG-TERM INSULATION FAILURE |
|---|---|---|---|---|---|---|---|---|---|---|---|
| COMPARATIVE EXMPE 1 | — | — | 87 | 82 | 18.9 | 20.3 | 1177.4 | 0.75 | 1.66% | 0/200 | 2/400 |
| EXAMPLE 1 | 200 | 0.68% | 70 | 69 | 17.6 | 18.0 | 1168.4 | 0.76 | 1.52% | 0/200 | 0/400 |
| EXAMPLE 2 | 150 | 0.91% | 59 | 60 | 16.3 | 13.7 | 1180.3 | 0.75 | 1.38% | 0/200 | 0/400 |
| EXAMPLE 3 | 100 | 1.37% | 45 | 47 | 13.9 | 12.4 | 1158.3 | 0.77 | 1.14% | 0/200 | 0/400 |
| EXAMPLE 4 | 50 | 2.73% | 38 | 29 | 8.7 | 7.9 | 1160.0 | 0.77 | 0.72% | 0/200 | 0/400 |
| EXAMPLE 5 | 40 | 3.41% | 23 | 19 | 6.3 | 7.1 | 1157.0 | 0.77 | 0.58% | 0/200 | 0/400 |
| COMPARATIVE EXAMPLE 2 | 30 | 4.55% | 11 | 15 | 5.5 | 5.2 | 1179.1 | 0.75 | 0.45% | 2/200 | 0/400 |
| COMPARATIVE EXAMPLE 3 | 20 | 6.83% | 4 | 8 | 3.0 | 4.1 | 1170.0 | 0.76 | 0.30% | 3/200 | 0/400 |

From the results of the examples 1 to 5 and the comparative examples 2 and 3, the height "a" and the height "b" of the printing saddle were greatly reduced as the interval "x" of the non-permeable volume part became shorter and the non-permeation ratio R became larger. Further, it can be seen that the smaller the height "a" and the height "b" of the printing saddle are, the smaller the height A and the height B in the curved portion after laminating are. That is, the curved amount ratio Q can be reduced by reducing the printing saddle.

With respect to the examples 1 to 5 and the comparative examples 1 to 3, delamination and long-term insulation failure were investigated. The long-term insulation failure is the number of NG in an accelerated test in which a voltage load is applied in a high temperature environment in 400 samples (the number of NG when the IR is 1/100 or less of that before the test at 9.45 V, 105 degrees C., 200 hours). The delamination is the number of samples for which delamination is confirmed by polishing up to the internal electrode and inspecting the number of samples of 200. The results are shown in Table 2.

In the comparative example 1, long-term insulation failure occurred. It is considered that this was because the curved amount ratio Q exceeds 1.60% and is too large. On the other hand, no long-term insulation failure occurred in any of the examples 1 to 5. It is considered that this was because the curved amount ratio Q was 1.60% or less and was appropriately reduced.

Next, in the comparative examples 2 and 3, the delamination occurred. It is considered that this was because the curved amount ratio Q was less than 0.50% and too small, and a sufficient anchor effect could not be obtained. On the other hand, the delamination did not occur in any of the examples 1 to 5. It is considered that this was because the curved amount ratio Q was 0.50% or more and was appropriately increased.

(Examples 6 to 7) Next, the curved amount ratio Q was adjusted by changing the dilution rate "d" of the metal conductive paste for the internal electrode pattern. In the comparative example 2, the dilution rate "d" was set to 8%. In the example 6, the dilution rate "d" was set to 10%. In the example 7, the dilution rate "d" was set to 12%. The results are shown in Table 3. As shown in Table 3, the height "a" and the height "b" of the printing saddle could be increased by increasing the dilution ratio "d", and as a result, the curved amount ratio Q could be increased. This is because the viscosity of the metal conductive paste increased due to the increase in the dilution ratio "d". As described above, when the curved amount ratio Q was too small, it could be seen that the curved amount ratio Q could be increased by increasing the height "a" and the height "b".

TABLE 3

| | d | a (nm) | b (nm) | A (μm) | B (μm) | C (μm) | P | Q |
|---|---|---|---|---|---|---|---|---|
| COMPARATIVE EXAMPLE 2 | 8% | 11 | 15 | 5.5 | 5.2 | 1179.1 | 0.75 | 0.45% |
| EXAMPLE 5 | 10% | 25 | 37 | 9.9 | 7.8 | 1175.5 | 0.75 | 0.75% |
| EXAMPLE 7 | 12% | 32 | 41 | 11.5 | 11.7 | 1168.8 | 0.76 | 0.99% |

Although the embodiments of the present invention have been described in detail, it is to be understood that the various change, substitutions, and alterations could be made hereto without departing from the spirit and scope of the invention.

What is claimed is:

1. A ceramic electronic device comprising:
   a multilayer structure having a structure in which each of a plurality of dielectric layers of which a main component is ceramic and each of a plurality of internal electrode layers are alternately stacked and having a substantially rectangular parallelepiped shape, the plurality of internal electrode layers being alternately exposed to each of two end faces opposite to each other of the rectangular parallelepiped shape;
   a first cover layer that is provided on a first end of the multilayer structure in a stacking direction, a main component of the first cover layer being ceramic; and
   a second cover layer that is provided on a second end of the multilayer structure in the stacking direction, a main component of the second cover layer being ceramic, a porosity of the second cover layer being higher than that of the first cover layer,
   wherein $Q=(A+B)/2C\times100(\%)$ is 0.5% or more and 1.6% or less, when, at an interface between the second cover layer and an uppermost one of the internal electrode layers in a cross section vertical to a direction in which the two end faces are opposite to each other, two heights of curvature portions of both ends of the interface in the stacking direction are respectively a height A and a height B from a height C, wherein the height C is a shortest height in the stacking direction from the first cover layer to the second cover layer, and
   wherein, in the cross section, at both ends in a direction vertical to the stacking direction, an amount by which the interface between the second cover layer and the uppermost one of the internal electrode layers curves upward in the stacking direction is larger than an amount by which the interface between the first cover layer and the lowermost one of the internal electrode layers curves downward in the stacking direction, and wherein the shortest height of the height C in the stacking direction is located at a center or around the center in the direction vertical to the stacking direction in the cross section.

2. The ceramic electronic device as claimed in claim 1, wherein a size of the ceramic electronic device is a 1608 shape or more, and wherein the 1608 shape has a length of 1.6 mm, a width of 0.8 mm and a height of 0.8 mm.

3. The ceramic electronic device as claimed in claim 1, wherein a number of layers L of the plurality of internal electrode layers is 600 or more.

4. The ceramic electronic device as claimed in claim 1, wherein a stacking density P=L/C is 0.58 or more, wherein L is a number of the internal electrode layers stacked in the ceramic electronic device.

5. The ceramic electronic device as claimed in claim 1, wherein the height C is 800 μm or more.

6. A manufacturing method of a ceramic electronic device comprising:

forming a plurality of stack units by screen-printing each of internal electrode patterns including metal powder on each of dielectric green sheets including ceramic powder;

forming a ceramic multilayer structure having a substantially rectangular parallelepiped shape by stacking the plurality of stack units on a first cover sheet including ceramic powder and stacking a second cover sheet including ceramic powder on the plurality of stack units so that the plurality of internal electrode layers are alternately exposed to each of two end faces opposite to each other of the rectangular parallelepiped shape; and forming a first cover layer from the first cover sheet and a second cover layer from the second cover sheet by firing the ceramic multilayer structure, wherein a screen used in the screen-printing has a non-permeable volume portion or a dilution rate of the internal electrode pattern is adjusted so that $Q=(A+B)/2C\times100(\%)$ is 0.5% or more and 1.6% or less, when, at an interface between the second cover layer and an uppermost one of the internal electrode layers in a cross section vertical to a direction in which the two end faces are opposite to each other, two heights of curvature portions of both ends of the interface in the stacking direction are respectively a height A and a height B from a height C, wherein the height C is a shortest height in the stacking direction from the first cover layer to the second cover layer, and wherein, in the cross section, at both ends in a direction vertical to the stacking direction, an amount by which the interface between the second cover layer and the uppermost one of the internal electrode layers curves upward in the stacking direction is larger than an amount by which the interface between the first cover layer and the lowermost one of the internal electrode layers curves downward in the stacking direction, and wherein the shortest height of the height C in the stacking direction is located at a center or around the center in the direction vertical to the stacking direction in the cross section.

7. The ceramic electronic device as claimed in claim 1, wherein $Q=(A+B)/2C\times100(\%)$ is 0.58% or more and 1.52% or less.

* * * * *